United States Patent
Birnbaum et al.

(10) Patent No.: US 8,896,524 B2
(45) Date of Patent: Nov. 25, 2014

(54) CONTEXT-DEPENDENT HAPTIC CONFIRMATION SYSTEM

(75) Inventors: David Birnbaum, Oakland, CA (US); Christopher J. Ullrich, Ventura, CA (US); Marcus Aurelius Bothsa, Santa Clara, CA (US)

(73) Assignee: Immersion Corporation, San Jose, CA (US)

( * ) Notice: Subject to any disclaimer, the term of this patent is extended or adjusted under 35 U.S.C. 154(b) by 168 days.

(21) Appl. No.: 13/593,626

(22) Filed: Aug. 24, 2012

(65) Prior Publication Data

US 2014/0055358 A1    Feb. 27, 2014

(51) Int. Cl.
 *G09G 5/00* (2006.01)
(52) U.S. Cl.
 USPC .......................................... 345/156; 715/702
(58) Field of Classification Search
 CPC .............. G06F 3/016; G06F 2203/014; G06F 2203/015; G10H 2220/31
 USPC .................... 345/156–158, 173; 715/701, 702
 See application file for complete search history.

(56) References Cited

U.S. PATENT DOCUMENTS

| | | | |
|---|---|---|---|
| 6,046,726 A * | 4/2000 | Keyson ......................... | 345/156 |
| 7,952,498 B2 | 5/2011 | Higa | |
| 2005/0134561 A1* | 6/2005 | Tierling et al. ............... | 345/156 |
| 2009/0002140 A1 | 1/2009 | Higa | |
| 2009/0231271 A1 | 9/2009 | Heubel et al. | |
| 2010/0033426 A1 | 2/2010 | Grant et al. | |
| 2010/0073304 A1 | 3/2010 | Grant et al. | |
| 2011/0102161 A1 | 5/2011 | Heubel et al. | |
| 2011/0175838 A1 | 7/2011 | Higa | |
| 2012/0019463 A1 | 1/2012 | Ng et al. | |
| 2012/0038582 A1 | 2/2012 | Grant | |
| 2012/0113008 A1 | 5/2012 | Makinen et al. | |

* cited by examiner

*Primary Examiner* — Regina Liang
(74) *Attorney, Agent, or Firm* — Miles & Stockbridge P.C.

(57) ABSTRACT

A haptic confirmation system is provided that produces a confirmation haptic effect in response to a user interaction with a user interface element, where the confirmation haptic effect is based on context metadata. The context metadata is mapped to one or more haptic parameters. A haptic signal is generated based on the one or more haptic parameters. The haptic signal is sent to an actuator configured to receive the haptic signal. The actuator utilized the haptic signal to generate the confirmation haptic effect.

20 Claims, 4 Drawing Sheets

CONTEXT-DEPENDENT HAPTIC CONFIRMATION SYSTEM

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. A device, such as a mobile device, touchscreen device, and personal computer, can be configured to generate confirmation haptic effects in response to a user's interaction with the device, as a confirmation that the user has successfully interacted with the device. For example, when a user interacts with the device using, for example, a button, touchscreen, lever, joystick, wheel, or some other control, a haptic signal can be generated, where the haptic signal causes the device to produce an appropriate confirmation haptic effect. The user can experience the confirmation haptic effect, and can be made aware of the successful interaction with the device.

SUMMARY

One embodiment is a haptic confirmation system that produces a confirmation haptic effect. The system receives context metadata associated with a user interaction of a user interface element. The system further maps the received context metadata to one or more haptic parameters. The system further generates a haptic signal based at least in part on the one or more haptic parameters. The system further sends the haptic signal to an actuator to generate the confirmation haptic effect.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic confirmation system that can produce a confirmation haptic effect in response to an interaction with a user interface element of a device, such as a button displayed within a touchscreen or a keyboard, where the confirmation haptic effect can be customized based on context metadata, or some other metadata, associated with the interaction of the user interface element. Such context metadata can include data indicating one or more physical properties of the user interface element, such as the size or shape of the user interface element. Context metadata can also include data indicating functionality of the user interface element.

For example, context metadata can include data indicating whether the user interface element initiates the creation of an email message or a text message. Context metadata can also include data indicating a history of interaction with the user interface element. For example, context metadata can include data indicating a speed at which a user either types on the user interface element (where the user interface element is a physical element, such as a keyboard), or touches the user interface element (where the user interface element is a virtual element that can be displayed within a touchscreen of the device, such as a button). Context metadata can also include sensor input data, such as a detected force produced by a touch applied to the user interface element by the user. The customization of the confirmation haptic effect can be a modification of one or more haptic parameters, such as, but not limited to, magnitude, duration, frequency, and waveform. Thus, the haptic confirmation system can generate multiple possible confirmation haptic events for a single user interface element, where each confirmation haptic event is individually customized based on context metadata.

Figure 1:
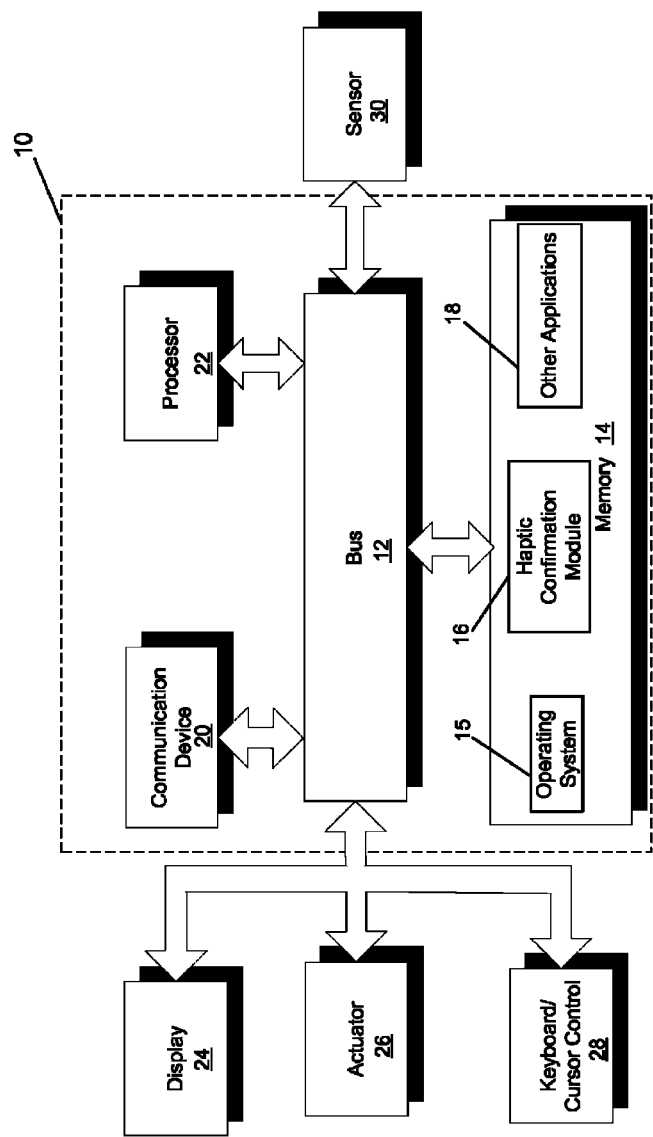
FIG. 1 illustrates a block diagram of a haptic confirmation system in accordance with one embodiment of the invention.

FIG. 1 illustrates a block diagram of a haptic confirmation system 10 in accordance with one embodiment of the invention. In one embodiment, system 10 is part of a device, and system 10 provides a haptic confirmation functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic confirmation module 16 that produces a confirmation haptic effect, as disclosed in more detail below. In certain embodiments, haptic confirmation module 16 can comprise a plurality of modules, where each individual module provides specific individual functionality for producing a confirmation haptic effect. System 10 will typically include one or more additional application modules 18 to include additional functionality, such as the Integrator Haptic Development Platform by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26. Processor 22 may transmit a haptic signal associated with a generated haptic effect to actuator 26, which in turn outputs haptic effects such as vibrotactile haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). In other embodiments, a separate device from system 10 includes an actuator that generates the haptic effects, and system 10 sends generated haptic effect signals to that device through communication device 20.

System 10, in one embodiment, further includes a sensor 30. Sensor 30 can be configured to detect a form of energy, or other physical property, such as, but not limited to, acceleration, bio signals, distance, flow, force/pressure/strain/bend, humidity, linear position, orientation/inclination, radio frequency, rotary position, rotary velocity, manipulation of a switch, temperature, vibration, and visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155, a miniature pressure transducer, a piezo sensor, a strain gage, a hygrometer, a linear position touch sensor, a linear potentiometer (or slider), a linear variable differential transformer, an accelerometer, a compass, an inclinometer, a magnetic tag (or radio frequency identification tag), a rotary encoder, a rotary potentiometer, a gyroscope, an on-off switch, a temperature sensor (such as a thermocouple, resistance temperature detector, thermistor, and temperature-transducing integrated circuit), microphone, photometer, altimeter, thermometer, bio monitor, or a light-dependent resistor.

Figure 2:
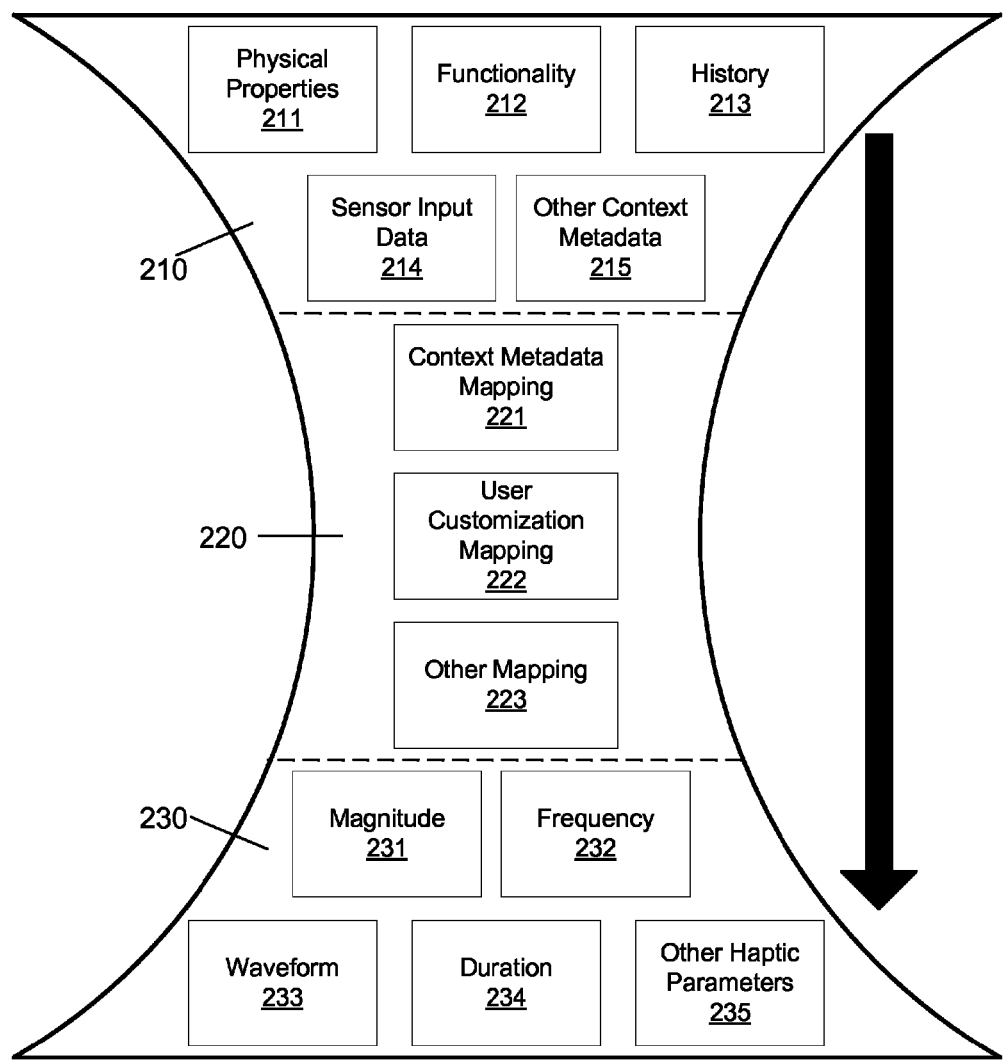
FIG. 2 illustrates a mapping of context metadata to one or more haptic parameters, according to an embodiment of the invention.

FIG. 2 illustrates a mapping of context metadata to one or more haptic parameters, according to an embodiment of the invention. As previously described, a device can include a user interface element, where a user interface element can be a physical or virtual element of the device that the user can interact with. An example of a physical user interface element is a keyboard, or cursor control, such as a mouse. An example of a virtual user interface element is an icon displayed within a touchscreen, such as a button, slider, scroller, switch, check box, and radio box. As also previously described, a user can interact with the user interface element, where an interaction with the user interface element can include a physical manipulation of the user interface element. An example of a physical manipulation of the user interface element is touching the user interface element (such as touching a keyboard or touching a touchscreen where a button, or some other type of user interface element, is displayed).

The interaction with the user interface element can involve the creation of one or more types of context metadata (illustrated in FIG. 2 as context metadata 210), where context metadata can be any data associated with a context of the interaction with the user interface element. The context metadata can be used to generate a confirmation haptic effect in response to the interaction with the user interface element. As is described below in greater detail, a confirmation haptic effect can be a haptic feedback effect, such as a force, vibration, and motion, which can be generated in response to a user interaction with a user interface element, in order to confirm the interaction with the user interface element.

An example of context metadata is data indicating one or more physical properties of the user interface element (illustrated in FIG. 2 as physical properties 211). The one or more physical properties can include a size or shape of the user interface element, where the size of the user interface element can comprise one or more size parameters, and the shape of the user interface element can comprise one or more shape parameters. For example, the one or more physical properties can include the size of a button displayed within a touchscreen of a device (i.e., one or more size parameters of the button). In this example, a confirmation haptic effect can be generated based on the one or more size parameters of the button. Thus, a small button can feel different (e.g., "lighter") to a user than a big button. In another example, the one or more physical properties can include the shape of the button (i.e., one or more shape parameters of the button). In another example, the one or more physical properties can include both the size and shape of the button (i.e., one or more size parameters of the button and one or more shape parameters of the button). Thus, both a size and shape of a button (or other user interface element) that a user interfaces with can be used to determine a confirmation haptic effect that is generated.

Another example of context metadata is data indicating functionality of the user interface element (illustrated in FIG. 2 as functionality 212). The functionality can be functionality associated with either the user interface element or the interaction with the user interface element. For example, the functionality can be the inputting of a character, or a word, within the user interface element. As another example, the functionality can be the creation of a text message, or email message, that can be initiated by the user interface element upon interaction with the user interface element. Thus, the functionality of the user interface element can be used to determine a confirmation haptic effect that is generated. For example, the inputting of a character within a field displayed within a touchscreen can generate a confirmation haptic effect that is different from a confirmation haptic effect that is generated when a word is input within the field. As another example, the pressing of a button displayed within a touchscreen in order to create a text message can cause a confirmation haptic effect to be generated. However, the same pressing of the button displayed within the touchscreen to create an email message can cause a different confirmation haptic effect to be generated.

Another example of context metadata is data indicating history of the user interface element (illustrated in FIG. 2 as history 213). The history can be history associated with one or more previous interactions with the user interface element. For example, the history of a user interface element (such as a keyboard or a button displayed within a touchscreen) can be a typing speed (i.e., a speed at which a user either types on a keyboard or touches a button displayed within the touchscreen). As an example, a confirmation haptic effect that feels desirable at a slow typing speed may feel undesirable at a fast typing speed. One reason for this may be because an actuator that generates the confirmation haptic effect may not be capable of generating cascading confirmation haptic effects at a certain speed because the duration of each confirmation haptic effect may be longer than the duration between each keystroke. Because of this, the confirmation haptic effects can blend into each other, and generate a "mushy" haptic experience. Another reason for this may be that a magnitude of the initial confirmation haptic effect may be so strong that it overpowers one or more weaker confirmation haptic effects that are subsequently generated. Thus, the typing speed can be used to automatically scale a magnitude, duration, or other parameter of a confirmation haptic effect to avoid having a plurality of confirmation haptic effects blend into each other or cause other undesirable results. The typing speed can be determined after a plurality of interactions with the user interface element. Thus, the modification of the confirmation haptic effect can occur as soon as soon as a change in typing speed is identified (i.e., after the plurality of interactions).

Another example of context metadata is sensor input data (illustrated in FIG. 2 as sensor input data 214). As previously described, a sensor can produce sensor input data associated with an interaction with the user interface element. For example, a sensor can generate sensor input data associated with a pressure produced by a user touching a user interface element (such as a keyboard or a button displayed within a touchscreen). Based on the pressure, a corresponding confirmation haptic effect can be generated. For example, as the pressure is increased (i.e., the user touches the user interface element harder), the magnitude of the confirmation haptic effect can increase (or decrease). As another example, a sensor can generate input data associated with an acceleration of a device that can indicate that the user is engaging is a physical activity, such as walking or running. As yet another example, a sensor can generate input data associated with sound produced by a user's environment. Based on the sound, it can be determined that the user's environment is noisy, and that the magnitude (or amplitude or intensity) of the confirmation haptic effect should be increased. As another example, a sensor can generate input data which is represented by information or signals that are created from processing data such as still images, video, or sounds. For example, a user interface element that is a virtual racing car that is displayed within a user interface can cause the confirmation haptic effect to be modified based on the car's virtual velocity, how close the car is to the camera viewing angle, or the size of the car.

Context metadata can also be any other kind of context metadata (illustrated in FIG. 2 as other context metadata 215). This can be any kind of data that is associated with an interaction with a user interface element. In certain embodiments, software stored in memory or another computer-readable or tangible medium, and executed by a processor, can generate one or more of the aforementioned types of context metadata. Further, software stored in memory or another computer-readable or tangible medium, and executed by a processor, can receive and interpret the context metadata. Such software can map the context metadata (in addition, in certain embodiments, to other received input data) to one or more haptic parameters (where the mapping is illustrated in FIG. 2 as mapping 220). Such mapping is further described below in greater detail.

According to the embodiment, in order to generate an appropriate confirmation haptic effect, where the confirmation haptic effect can confirm a user interaction with a user interface element, one or more haptic parameters can be produced (where the one or more haptic parameters are illustrated in FIG. 2 as haptic parameters 230). As previously described, a confirmation haptic effect is a haptic feedback effect, such as a force, vibration, and motion, which can be generated in response to a user interaction with a user interface element, in order to confirm the interaction with the user interface element. In certain embodiments, a confirmation haptic effect is a static haptic effect. Also, in certain embodiments, the confirmation haptic effect can be stored in, and selected from, a library of haptic effects. In certain embodiments, the library of haptic effects can be stored in a memory. A haptic parameter is a quantity of a haptic effect quality, such as magnitude, frequency, duration, amplitude (i.e., strength), waveform, or any other kind of quantifiable haptic parameter. According to the embodiment, a confirmation haptic effect can be defined, at least in part, by the one or more haptic parameters, where the one or more haptic parameters can define characteristics of the confirmation haptic effect. The one or more haptic parameters are further described below in greater detail.

In order to produce the one or more haptic parameters, as previously described, input data can be mapped to the one or more haptic parameters. More specifically, the one or more haptic parameters can be generated based on, at least in part, the input data. As part of the mapping, the context metadata can be mapped to the one or more haptic parameters (identified in FIG. 2 as context metadata mapping 221). More specifically, the one or more haptic parameters can each include a value that can be based, at least in part, on the context metadata. For example, if the context metadata (such as a size of a user interface element) is of a particular value, the one or more haptic parameters can be generated with a particular value as well. Thus, the context metadata can define, at least in part, the one or more haptic parameters.

In certain embodiments, context metadata mapping is the only mapping that is performed before a confirmation haptic effect is generated. However, in alternate embodiments, context metadata mapping can be combined with other mappings. For example, in certain embodiments, in addition to context metadata mapping, a user can perform a customized mapping (identified in FIG. 2 as user customization mapping 222). As part of the customized mapping, the one or more haptic parameters can be modified based on one or more multipliers defined by the user. More specifically, a value for the one or more haptic parameters can be modified based on the one or more multipliers defined by the user. The one or more multipliers defined by the user can be based on one or more sliders that are part of a slider user interface. A slider user interface is described below in greater detail, with respect to FIG. 3. By modifying the one or more haptic parameters, the confirmation haptic effect can be modified based on the one or more multipliers. In certain embodiments, the one or more multipliers can be globally defined for all user interface elements. In other embodiments, the one or more multipliers can be locally defined for a specific user interface element, or a specific plurality of user interface elements. In certain embodiments, the user customization mapping is performed after the context metadata mapping. In alternate embodiments, the user customization mapping is performed before the context metadata mapping. In certain embodiments, the one or more multipliers are consistently applied to all user interface elements. In alternate embodiments, the one or more multipliers are applied to the user interface elements based on the context metadata associated with each user interface element. For example, if a multiplier is a low value, a difference in a haptic parameter (such as magnitude) between a small button and a large button can be reduced. However, if a multiplier is a high value, a difference in the haptic parameter between the small button and the large button can be increased.

In certain embodiments, in addition to context metadata mapping, and user customization mapping, one or more other mappings are performed (identified in FIG. 2 as other mapping 223). For example, theme mapping can be performed, where theme mapping includes modifying one or more haptic parameters based on a defined theme, where a theme is an installable package that includes one or more haptic effects, and a mapping of one or more haptic parameters to one or more user interface elements in order to generate the one or more haptic effects. As another example, dynamic mapping can be performed, where data (such as context metadata) from a plurality of user interface element interactions can be mapped to one or more haptic parameters. The one or more other mappings can also be any other type of mapping, where data is mapped to one or more haptic parameters.

As previously described, one or more haptic parameters can be produced (where the one or more haptic parameters are illustrated in FIG. 2 as haptic parameters 230), based on the one or more mappings. As also previously described, a haptic parameter is a quantity of a haptic effect quality. A haptic parameter can have a value associated with the haptic parameter. An example of a haptic parameter is a magnitude haptic parameter (identified in FIG. 2 as magnitude 231), where a magnitude haptic parameter defines a magnitude value of a confirmation haptic effect. Another example of a haptic parameter is a frequency haptic parameter (identified in FIG. 2 as frequency 232), where a frequency haptic parameter defines a frequency value of the confirmation haptic effect. Yet another example of a haptic parameter is a duration haptic parameter (identified in FIG. 2 as duration 233), where a duration haptic parameter defines a duration value of the confirmation haptic effect. Yet another example of a haptic parameter is a waveform haptic parameter (identified in FIG. 2 as waveform 234), where a waveform duration haptic parameter defines a waveform value of the confirmation haptic effect. Other examples of haptic parameters include any other types of quantifiable haptic parameter that define quantifiable values of the confirmation haptic effect.

In certain embodiments, software stored in memory or another computer-readable or tangible medium, and executed by a processor, can interpret the one or more haptic parameters and generate one or more haptic signals based, at least in part, on the one or more haptic parameters. In certain embodiments, the one or more haptic parameters define one or more characteristics of the haptic signal. For example, a magnitude haptic parameter can define a magnitude of the haptic signal. As another example, a frequency haptic parameter can define a frequency of the haptic signal. As yet another example, a waveform haptic parameter can define a waveform of the haptic signal. As yet another example, a duration haptic parameter can define a duration of the haptic signal.

Further, software stored in memory or another computer-readable or tangible medium, and executed by a processor, can send the one or more haptic signals to one or more actuators. At each actuator of the one or more actuators, the actuator can receive at least one haptic signal of the one or more haptic signals and output one or more confirmation haptic effects based on the at least one haptic signal. Thus, the at least one haptic signal can define one or more characteristics of the one or more confirmation haptic effects. In certain embodiments involving a plurality of actuators, the actuators can load share the one or more haptic signals. For example, some of the one or more haptic signals that are associated with a first set of user interface elements can be sent to a first actuator, and the other haptic signals of the one or more haptic signals that are associated with a second set of user interface elements can be sent to a second actuator. In certain embodiments involving a plurality of actuators, some actuators are mechanical actuators, and other actuators are non-mechanical actuators.

Figure 3:
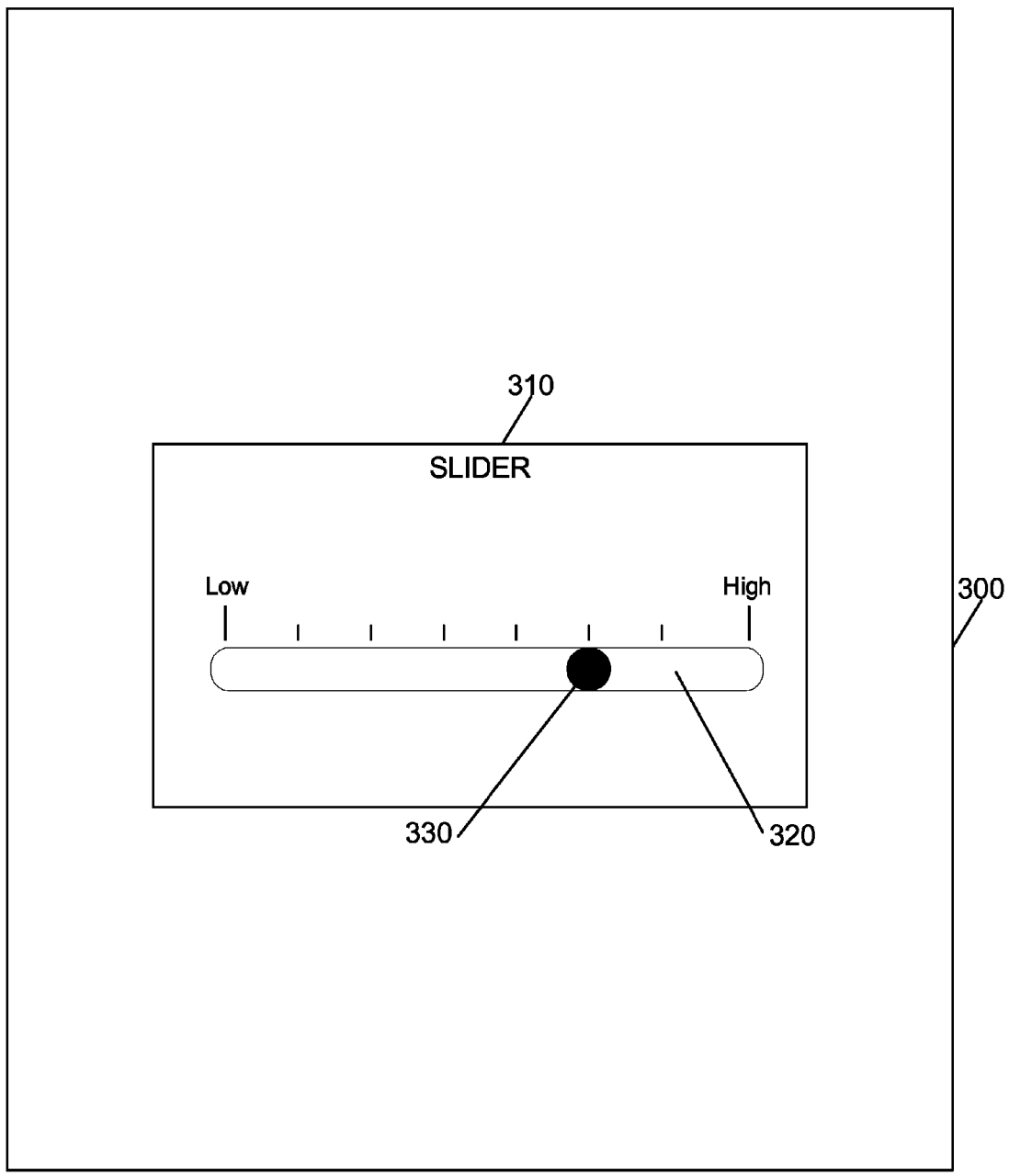
FIG. 3 illustrates a haptic parameter slider user interface, according to an embodiment of the invention.

FIG. 3 illustrates a haptic parameter slider user interface, according to an embodiment of the invention. More specifically, FIG. 3 illustrates a device 300 that displays a haptic parameter slider user interface 310. In certain embodiments, device 300 includes a touchscreen, where haptic parameter slider user interface 310 is displayed within the touchscreen. As previously described, in addition to context metadata mapping, a user can perform a customized mapping. As part of the customized mapping, one or more haptic parameters can be modified based on one or more multipliers defined by the user. In certain embodiments, the one or more multipliers can be defined by one or more sliders of slider user interface 310. Thus, slider user interface 310 can control one or more multipliers used to modify one or more haptic parameters.

In the illustrated embodiment of FIG. 3, slider user interface 310 includes a single slider, slider 320. However, this is merely an example embodiment, and in other embodiments, slider user interface 310 can include a plurality of sliders. Slider 320 can be associated with a multiplier used to modify a haptic parameter. For example, slider 320 can be associated with a magnitude multiplier used to modify a magnitude haptic parameter. As another example, slider 320 can be associated with a frequency multiplier used to modify a frequency haptic parameter. As yet another example, slider 320 can be associated with a waveform multiplier used to modify a waveform haptic parameter. As yet another example, slider 320 can be associated with a duration multiplier used to modify a duration haptic parameter. In embodiments where slider user interface 310 includes a plurality of sliders, each slider can be associated with a specific multiplier used to modify a specific haptic parameter. Thus, slider 320 can control a multiplier used to modify a haptic parameter.

According to the illustrated embodiment, slider 320 includes slider control 330. Slider control 330 is an exposed user interface element that allows a user to control the multiplier associated with slider 320. By moving slider control 330 to the left or to the right of slider 320, the user can control the multiplier associated with slider 320, and thus, control the haptic parameter associated with slider 320. For example, in an embodiment where slider 320 is associated with a magnitude multiplier used to modify a magnitude haptic parameter, the user can increase or decrease the value of the magnitude haptic parameter, and thus, increase or decrease a confirmation haptic effect associated with a user interface element, by moving slider control 330.

In certain embodiments, slider 320 can globally control a multiplier used to modify a haptic parameter all user interface elements. In other embodiments, slider 320 can locally control a multiplier used to modify a haptic parameter for a specific user interface element, or a specific plurality of user interface elements. In certain embodiments, slider 320 consistently applies the multiplier to all user interface elements. In alternate embodiments, slider 320 applies the multiplier to the user interface elements based on the context metadata associated with each user interface element. For example, if slider control 330 is set to a low value, a difference in a haptic parameter (such as magnitude) between a small user interface element and a large user interface element can be reduced. However, if slider control 330 is set to a high value, a difference in the haptic parameter between the small user interface element and the large user interface element can be increased. The functionality of slider 320 can be replicated in user interface elements other than sliders, including but not limited to, dials, wheels, spinners, buttons, radio buttons, scrollers, switches, or checkboxes. The functionality of slider 320 may also be replicated with hardware user interface elements including but not limited to physical buttons, rocker switches, physical sliders, and "softkeys" (regions on a hardware surface that, when touched, activate some software functionality).

Figure 4:
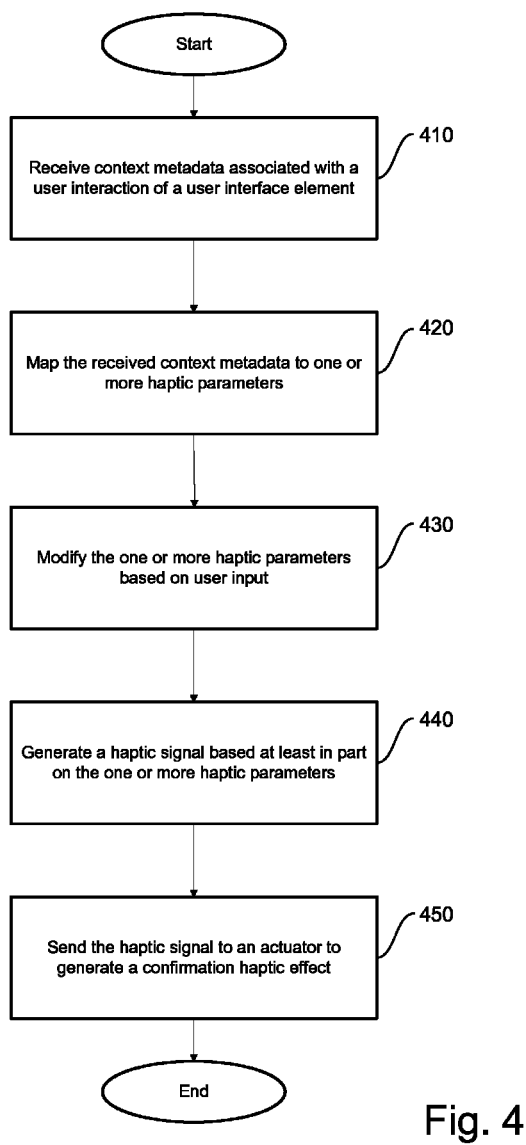
FIG. 4 illustrates a flow diagram of the functionality of a haptic confirmation module, according to one embodiment of the invention.

FIG. 4 illustrates a flow diagram of the functionality of a haptic confirmation module (such as haptic confirmation module 16 of FIG. 1), according to one embodiment of the invention. In one embodiment, the functionality of FIG. 4 is implemented by software stored in memory or another computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, the functionality may be performed by hardware using analog components.

The flow begins and proceeds to 410. At 410, context metadata associated with a user interaction of a user interface element is received. As previously described, a user interface element can be a physical or virtual element of a device that the user can interact with. An example of a physical user interface element is a keyboard, or cursor control, such as a mouse. An example of a virtual user interface element is an icon displayed within a touchscreen, such as a button, slider, scroller, switch, check box, and radio box. An interaction with the user interface element can include a physical manipulation of the user interface element. An example of a physical manipulation of the user interface element is touching the user interface element (such as touching a keyboard or touching a touchscreen where a button, or some other type of user interface element, is displayed). Context metadata can be any data associated with a context of the interaction with the user interface element. Context metadata can include data indicating one or more physical properties of the user interface element. The one or more physical properties can include a size the user interface element, where the size of the user interface element can comprise one or more size parameters. The one or more physical properties can include a shape of the user interface element, where the shape of the user interface element can comprise one or more shape parameters. Context metadata can alternately include data indicating functionality of the user interface element. The functionality can include functionality associated with either the user interface element or the interaction with the user interface element. Context metadata can alternately include data indicating history of the user interface element. The history can include history associated with one or more previous interactions with the user interface element. Context metadata can alternately include sensor input data. The sensor input data can include sensor input data associated with an interaction with the user interface element. Context metadata can alternatively include other types of context metadata. The flow proceeds to 420.

At 420, the received context data is mapped to one or more haptic parameters. A haptic parameter can be a quantity of a haptic effect quality. Examples of a haptic parameter can include a magnitude haptic parameter, a frequency haptic parameter, a duration haptic parameter, an amplitude (i.e., strength) haptic parameter, and a waveform haptic parameter. The one or more haptic parameters can define, at least in part, a confirmation haptic effect. A confirmation haptic effect can be a haptic feedback effect, such as a force, vibration, and motion, which can be generated in response to a user interaction with a user interface element, in order to confirm the interaction with the user interface element. In certain embodiments, as a result of the mapping, the one or more haptic parameters can each include a value, based at least in part on the received context metadata. The flow proceeds to 430.

At 430, the one or more haptic parameters are modified based on user input. The user input can include one or more multipliers defined by the user. Each value included for each of the one or more haptic parameters can be based on the one or more multipliers defined by the user. By modifying the one or more haptic parameters, the confirmation haptic effect can be modified based on the one or more multipliers. In certain embodiments, the one or more multipliers can be globally defined for all user interface elements. In other embodiments, the one or more multipliers can be locally defined for a specific user interface element, or a specific plurality of user interface elements. In certain embodiments, the user customization mapping is performed after the context metadata mapping. In alternate embodiments, the user customization mapping is performed before the context metadata mapping. The one or more multipliers defined by the user can be based on one or more sliders that are part of a slider user interface. In other embodiments, the one or more multipliers defined by the user can be based on user interface elements other than sliders, including but not limited to, dials, wheels, spinners, buttons, radio buttons, scrollers, switches, or checkboxes. In other embodiments, the one or more multipliers defined by the user can be based on hardware user interface elements including but not limited to physical buttons, rocker switches, physical sliders, and "softkeys." In certain embodiments, the modification of the one or more haptic parameters performed at 430 is omitted. The flow proceeds to 440.

At 440, a haptic signal is generated based at least in part on the one or more haptic parameters. In certain embodiments, the one or more haptic parameters define one or more characteristics of the haptic signal. The flow proceeds to 450.

At 450, the haptic signal is sent to an actuator to generate a confirmation haptic effect. A confirmation haptic effect can be a haptic feedback effect which can be generated in response to a user interaction with a user interface element, in order to confirm the interaction with the user interface element. In certain embodiments, the actuator can receive the haptic signal and output the confirmation haptic effect based on the haptic signal. In certain embodiments, the haptic signal defines one or more characteristics of the confirmation haptic effect. The flow then ends.

In certain embodiments involving a subsequent user interaction with the user interface element, additional (i.e., "other") context metadata associated with the subsequent user interaction with the user interface element can be received. The other context metadata can be mapped to a new set of (i.e., "other") one or more haptic parameters. Another haptic signal can be generated based, at least in part, on the other one or more haptic parameters. The another haptic signal can be sent to the actuator to generate another confirmation haptic effect, where the another confirmation haptic effect is different from the previously confirmation haptic effect generated by the actuator.

Thus, a haptic confirmation system is provided that generates one or more confirmation haptic effects based on context metadata associated with a user interaction with a user interface element. Thus, in contrast to known haptic systems, where confirmation haptic effects for user interface elements are generally one confirmation type per element, embodiments of the invention can provide for multiple possible confirmation haptic events for a single user interface element, based on context metadata.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to generate a confirmation haptic effect, the generating the confirmation haptic effect comprising:
   receiving context metadata associated with a user interaction of a user interface element, wherein the context metadata comprises at least one of: data indicating a functionality of the user interface element, or data indicating a history of the user interface element;
   mapping the received context metadata to one or more haptic parameters;
   generating a haptic signal based at least in part on the one or more haptic parameters; and
   sending the haptic signal to an actuator to generate the confirmation haptic effect.

2. The non-transitory computer-readable medium of claim 1, further comprising modifying the one or more haptic parameters based on user input.

3. The non-transitory computer-readable medium of claim 2,
   wherein the user input comprises one or more multipliers defined by the user; and
   wherein each value included for each of the one or more haptic parameters is based on the one or more multipliers.

4. The non-transitory computer-readable medium of claim 3, wherein the one or more multipliers are globally defined for all user interface elements.

5. The non-transitory computer-readable medium of claim 3, wherein the one or more multipliers are locally defined for a specific user interface element or a specific plurality of user interface elements.

6. The non-transitory computer-readable medium of claim 1, wherein the context metadata further comprises at least one of: data indicating one or more physical properties of the user interface element, or sensor input data.

7. The non-transitory computer-readable medium of claim 1, wherein the one or more haptic parameters comprises at least one of: a magnitude haptic parameter, a frequency haptic parameter, a duration haptic parameter, an amplitude haptic parameter, or a waveform haptic parameter.

8. The non-transitory computer-readable medium of claim 1, wherein the user interface element comprises at least one of: a physical element of a device or a virtual element of a device.

9. The non-transitory computer-readable medium of claim 8, wherein the user interface element comprises a button displayed on a touchscreen of the device.

10. The non-transitory computer-readable medium of claim 1, further comprising:
    receiving other context metadata associated with a subsequent user interface of the user interface element;
    mapping the other context metadata to one or more other haptic parameters;
    generating another haptic signal based at least in part on the one or more other haptic parameters; and
    sending the another haptic signal to the actuator to generate another confirmation haptic effect, wherein the another confirmation haptic effect is different from the confirmation haptic effect.

11. A computer-implemented method for producing a confirmation haptic effect, the computer-implemented method comprising:
    receiving context metadata associated with a user interaction of a user interface element, wherein the context metadata comprises at least one of: data indicating a functionality of the user interface element, or data indicating a history of the user interface element;
    mapping the received context metadata to one or more haptic parameters;
    generating a haptic signal based at least in part on the one or more haptic parameters; and
    sending the haptic signal to an actuator to generate the confirmation haptic effect.

12. The computer-implemented method of claim 11, further comprising modifying the one or more haptic parameters based on user input.

13. The computer-implemented method of claim 11, wherein the context metadata comprises at least one of: data indicating one or more physical properties of the user interface element, or sensor input data.

14. The computer-implemented method of claim 11, wherein the one or more haptic parameters comprises at least one of: a magnitude haptic parameter, a frequency haptic parameter, a duration haptic parameter, an amplitude haptic parameter, or a waveform haptic parameter.

15. The computer-implemented method of claim 11, wherein the user interface element comprises at least one of: a keyboard or a button displayed on a touchscreen of a device.

16. A haptic confirmation system comprising:
    a memory configured to store a haptic confirmation module;

a processor configured to execute the haptic confirmation module stored on the memory; and an actuator configured to output one or more confirmation haptic effects;

wherein the haptic confirmation module is configured to receive context metadata associated with a user interaction of a user interface element, wherein the context metadata comprises at least one of: data indicating a functionality of the user interface element, or data indicating a history of the user interface element;

wherein the haptic confirmation module is further configured to map the received context metadata to one or more haptic parameters;

wherein the haptic confirmation module is further configured to generate a haptic signal based at least in part on the one or more haptic parameters; and wherein the haptic confirmation module is further configured to send the haptic signal to an actuator to generate the confirmation haptic effect.

17. The haptic confirmation system of claim 16, wherein the haptic confirmation module is further configured to modify the one or more haptic parameters based on user input.

18. The haptic confirmation system of claim 16, wherein the context metadata comprises at least one of: data indicating one or more physical properties of the user interface element, or sensor input data.

19. The haptic confirmation system of claim 16, wherein the one or more haptic parameters comprises at least one of: a magnitude haptic parameter, a frequency haptic parameter, a duration haptic parameter, an amplitude haptic parameter, or a waveform haptic parameter.

20. The haptic confirmation system of claim 16, wherein the user interface element comprises at least one of: a keyboard or a button displayed on a touchscreen of a device.

* * * * *